(12) United States Patent
Viswanath et al.

(10) Patent No.: US 8,166,537 B1
(45) Date of Patent: *Apr. 24, 2012

(54) SERVICE-BASED NETWORK ACCESS

(75) Inventors: Kaartik Viswanath, Santa Clara, CA (US); Jayaraman R. Iyer, Sunnyvale, CA (US); Marco C. Centemeri, Rho (IT); Wen-Lin Tsao, Fremont, CA (US); Laurent Andriantsiferana, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 3072 days.

This patent is subject to a terminal disclaimer.

(21) Appl. No.: 10/229,465

(22) Filed: Aug. 27, 2002

(51) Int. Cl.
*G06F 12/00* (2006.01)
(52) U.S. Cl. .................... 726/12; 726/2; 726/3; 726/11; 713/153; 713/154
(58) Field of Classification Search .................. 709/228, 709/229; 455/411, 414.1, 414.3, 417, 422.1, 455/432.1, 432.3, 433, 434; 370/355, 338; 726/2, 3, 11, 12; 713/153, 154
See application file for complete search history.

(56) References Cited

U.S. PATENT DOCUMENTS

| | | | | |
|---|---|---|---|---|
| 6,496,505 | B2 | 12/2002 | La Porta et al. | 370/392 |
| 6,504,839 | B2 | 1/2003 | Valentine et al. | 370/354 |
| 6,944,150 | B1 * | 9/2005 | McConnell et al. | 370/352 |
| 2002/0075859 | A1 * | 6/2002 | Mizell et al. | 370/355 |
| 2003/0212800 | A1 * | 11/2003 | Jones et al. | 709/228 |
| 2004/0023642 | A1 * | 2/2004 | Tezuka | 455/411 |

OTHER PUBLICATIONS

ETSI, "Draft ETSI EN 301 347 v7.3.0 (Jan. 2001); Digital cellular telecommunications system (Phase 2+); General Packet Radio Service (GPRS); GPRS Tunnelling Protocol (GTP) across the Gn and Gp Interface (GSM 09.60 version 7.3.0 Release 1998)," European Telecommunications Standards Institute, pp. 1-69, 2000.

* cited by examiner

*Primary Examiner* — Kim Vu
*Assistant Examiner* — Baotran N To
(74) *Attorney, Agent, or Firm* — Baker Botts L.L.P.

(57) ABSTRACT

In a telephony communication system, an operator network provides access to data networks through gateways. The gateways provide access in response to network access requests from equipment such as mobile devices. The mobile devices and gateways providing access to the networks support service-based network access requests. These service-based network access requests permit networks to manage user access based on particular services requested.

22 Claims, 3 Drawing Sheets

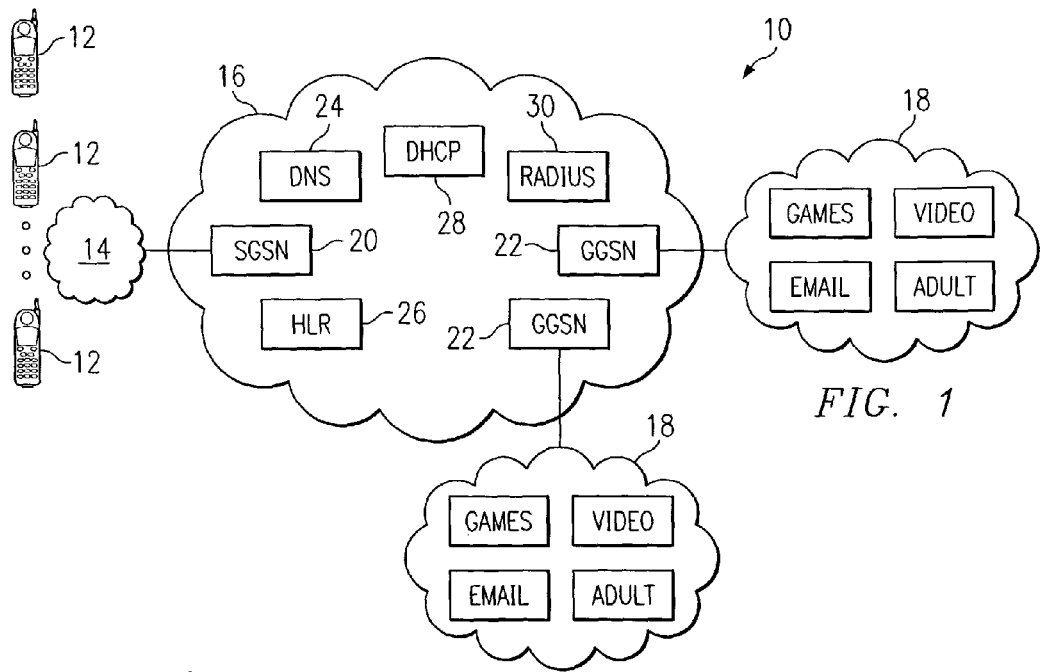
FIG. 1
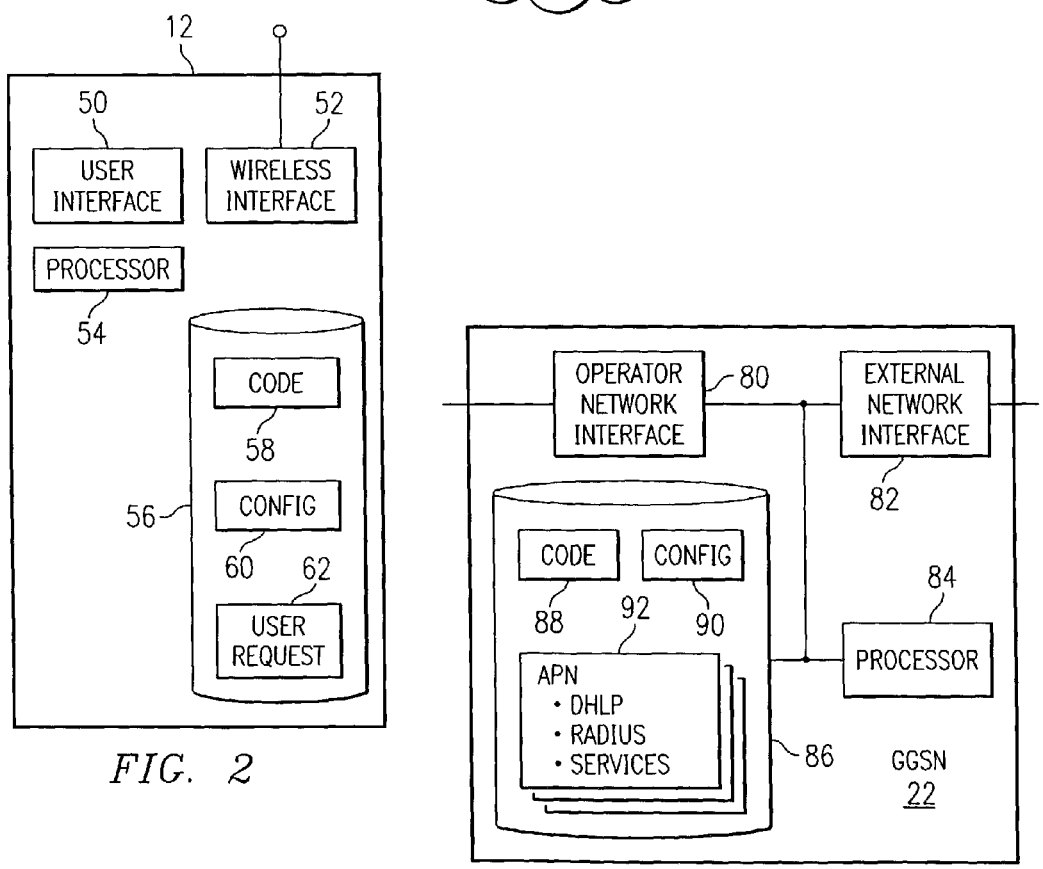
FIG. 2
FIG. 3

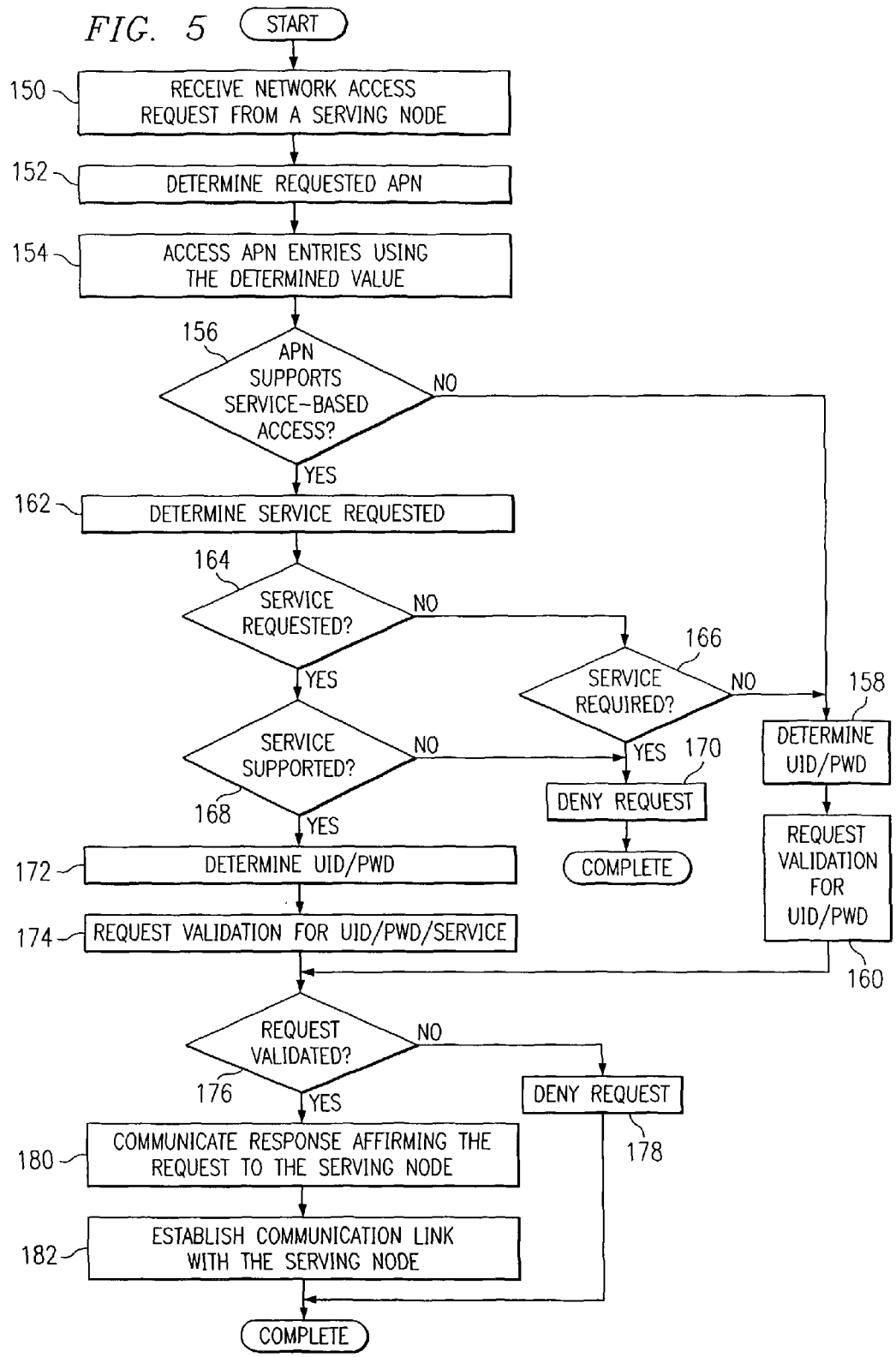

US 8,166,537 B1

SERVICE-BASED NETWORK ACCESS

TECHNICAL FIELD OF THE INVENTION

The present invention relates generally to network access and, more particularly, to service-based network access.

BACKGROUND OF THE INVENTION

As wireless devices become increasingly sophisticated, protocols and network equipment have evolved to support enhanced access, such as packet-based communications with data networks. One protocol supporting this type of access is generalized packet radio service (GPRS), which allows packet-based access to networks, such as the Internet and intranets.

SUMMARY OF THE INVENTION

In accordance with the present invention, techniques for supporting service selection during network access are provided. According to particular embodiments, the system permits mobile devices to specify particular services to access within networks.

According to a particular embodiment, a method for processing network access requests for mobile devices receives a network access request for establishment of a communication link for data communications for a mobile device, the network access request comprising a pass-through field and a requested network field that indicates a data network. The method determines a requested service from text in the pass-through field, a user identifier, and a password. The method further requests validation of the network access request based on the user identifier, the password, the data network, and the requested service, receives validation of the network access request, and establishes the communication link for the transport of packets communicated between the mobile device and the data network.

Embodiments of the invention provide various technical advantages. These techniques permit service-based access to networks. For example, a mobile user may access video services offered by a particular network. Using service-based access, the system can manage access of users to particular services. This allows network providers increased flexibility in pricing and potentially provide additional revenue streams. In addition, particular embodiments permit service-based access using techniques that operate with existing equipment and protocols.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 illustrates a communication system that includes mobile devices and gateways that support service-based access to networks in accordance with particular embodiments of the invention;

FIG. 2 is a block diagram illustrating exemplary functional components for a mobile device from the system;

FIG. 3 is a block diagram illustrating exemplary functional components for a gateway of the system;

FIG. 5 is a flowchart illustrating a method for the gateway to process a network access request that may request access to a particular network service.

DETAILED DESCRIPTION OF THE DRAWINGS

Figure 4:
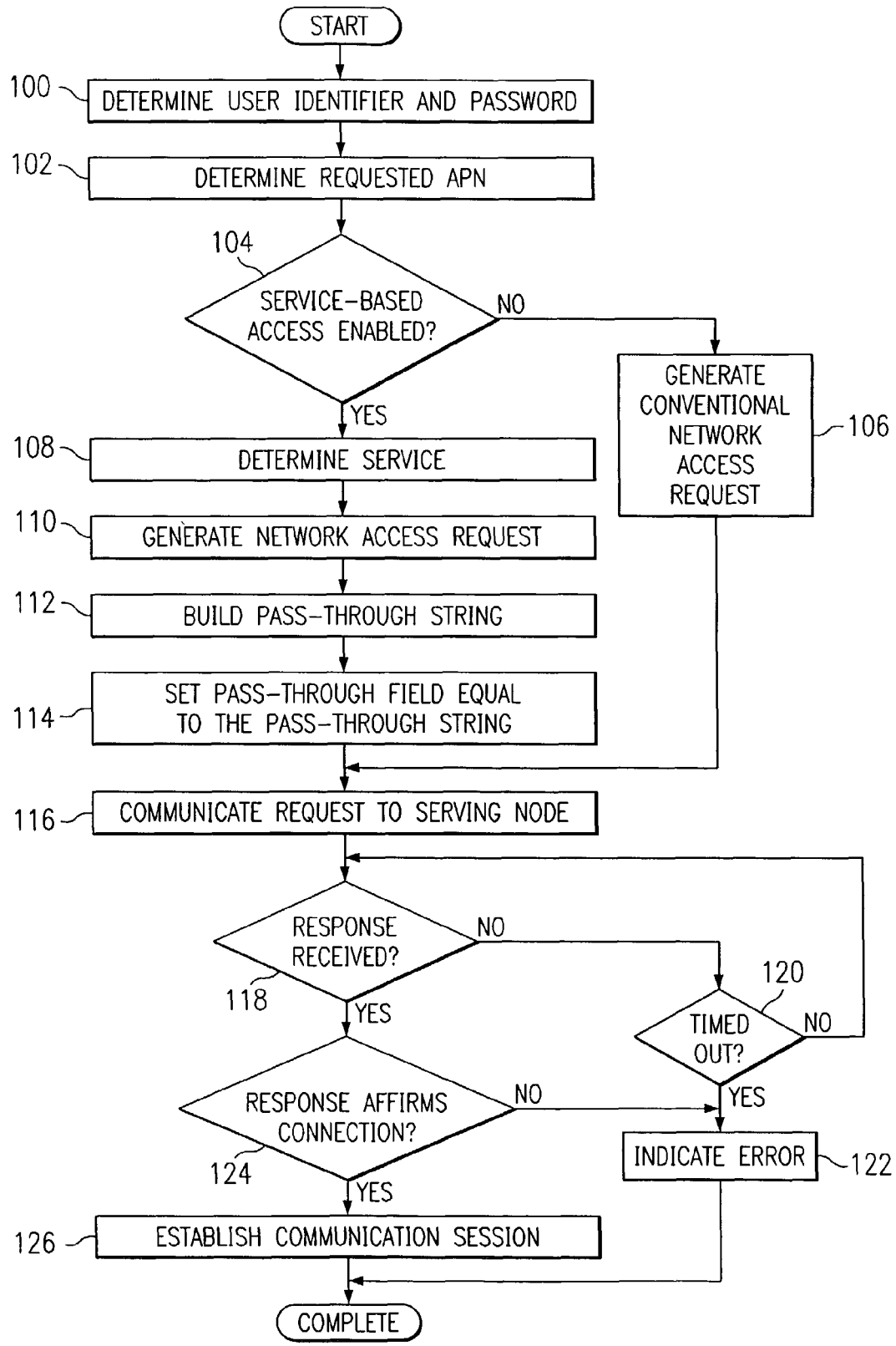
FIG. 4 is a flowchart illustrating a method for the mobile device to generate a network access request for service-based access to a network.

FIG. 1 illustrates a communication system, indicated generally at 10, that includes mobile devices 12, a radio access network 14, an operator network 16, and data networks 18. In general, elements of system 10 support wireless communications and access of mobile devices 12 to data services provided by networks such as data networks 18. To access data networks 18, mobile devices 12 generate network access requests that identify the requested network using, for example, an access point name (APN) assigned to the network. According to particular embodiments, elements of system 10 are configured to support service-based access to networks. For service-based access, elements use techniques to specify requested services within network access requests and to interpret these requests.

Mobile devices 12 support wireless communications and provide packet-based access to networks, such as data networks 18. Mobile devices 12 may be, for example, mobile phones, personal digital assistance, wireless enabled computers, or other suitable device for providing wireless access to data networks. According to particular embodiments, mobile devices 12 support generalized packet radio service (GPRS) protocols to access voice and data services. However, system 10 contemplates adapting the disclosed techniques for any suitable equipment and protocols. Mobile devices 12 access data networks using wireless communications supported by radio access network 14. To access data networks, mobile devices 12 generate requests that identify access point names of the requested data networks. In addition to the requested APN, network access requests also include other information, such as a user identifier, password, and mobile device identifier.

To access services provided by a requested network, mobile devices 12 identify the desired service within a field of the request. According to particular embodiments, mobile devices 12 use a field not typically assigned for indicating the requested network or service. For example, mobile device 12 may indicate the requested service within a user identifier field using a delimited string that specifies both the user identifier and the requested service. This permits system 10 to support service-based access without requiring all elements to have an awareness of the support.

Radio access network (RAN) 14 supports wireless access of mobile devices 12 to voice and/or data services. Thus, RAN 14 represents any suitable collection and arrangement of components, such as radio transceivers and support infrastructure, that link mobile devices 12 to operator network 16. Within system 10, operator network 16 links RAN 14 to one or more data networks 18. Data networks 18 represent any suitable networks providing network services to accessing devices, such as mobile devices 12. These network services include the communication of information such as voice, video, and data using packet-based protocols. According to particular embodiments, various data networks may support particularized access to services. For example, in the embodiment illustrated, one data network 18 provides services including games, video, email, and adult content. Moreover, this data network 18 supports particularized access to one or more of these services. However, while the embodiment illustrated includes only two data networks 18, system 10 contemplates having one or more operator networks 16 each linking to any number of data networks 18.

Within system 10, operator network 16 provides a link between data networks 18 and users, such as mobile devices 12. In the embodiment illustrated, operator network 16 includes a serving node 20 linking to RAN 14 and gateways 22 linking to data networks 18. In addition, operator network 16 includes a domain name server (DNS) 24, a home location register (HLR) 26, a dynamic host configuration protocol (DHCP) server 28, and a radius server 30. Domain name server 24 maps domain names to internet protocol (IP) addresses and returns these addresses in response to appropriate requests. For example, in response to a request identifying a particular access point name, domain name server 24 returns a list of IP addresses for one or more gateways 22 providing access to the identified access point name. HLR 26 provides traditional home location register features for operator network 16. DHCP server 28 enables dynamic assignment of IP addresses to requesting devices. Radius server 30 provides for authorization and authentication of users.

Serving node 20 links to RAN 14 and handles initial processing of network access requests received from mobile devices 12. For example, according to particular embodiments, operator network 16 supports GPRS protocols, and serving node 20 acts as a serving GPRS support node (SGSN). Upon receiving a network access request from one of mobile devices 12, serving node 20 accesses HLR 26 to verify the request. For example, serving node 20 may identify an access point name from the request and access HLR 26 to determine whether the indicated access point name identifies a valid network. Thus, the configuration of HLR 26 can control whether or not mobile devices 12 may access particular networks.

Upon receiving appropriate verification from HLR 26, serving node 20 accesses domain name server 24 to determine an IP address associated with the access point name identified in the network access request. In response, domain name server 24 returns one or more IP address matching to the access point name. Since gateways 22 typically provide access to data networks 18, domain name server 24 is configured to return IP addresses of appropriate gateways 22 in response to domain name requests.

Upon receiving an IP address from domain name server 24, serving node 20 forwards the network access request to the identified IP address. As a part of this process, serving node 20 may reformat and/or supplement the request with additional information. For example, according to particular embodiments, serving node 20 uses the information from an access request received from mobile device 12 to generate a create packet data protocol (PDP) context request. The create PDP context request includes information element fields such as an APN information element and a protocol configuration option (PCO) information element. The APN information element identifies the requested network, and the PCO information element includes information such as the user identifier, password, and authentication method. Regardless of the exact format, the network access request generated by serving node 20 includes the access point name, user identifier, password, and other data received from mobile device 12. After performing appropriate formatting or processing of the information from mobile device 12, serving node 20 forwards the network access request to gateway 22 identified by domain name server 24.

Gateways 22 link operator network 16 to data networks and, along with serving nodes 20, provide mobile devices 12 access to these data networks. In the embodiment illustrated, each gateway 22 links with one data network 18. However, while each gateway 22 is shown linking to a single network, each gateway 22 may link with multiple networks, and multiple gateways 22 may link to the same network. As previously discussed, these networks or portions of these networks are identified by access point names, which, for example, can be names defined or assigned by standards organizations to uniquely identify IP networks. Each data network 18 may offer one or more specific services that may be requested by mobile devices 12.

During operation, gateways 22 provide access to data networks in response to network access requests forwarded by serving node 20. For example, after appropriately processing a network access request from serving node 20, gateway 22 and serving node 20 may form a communication link to transport packets across operator network 16. This communication link then serves as a transport mechanism for packets between mobile device 12 and data network 18. According to particular embodiments, gateway 22 and serving node 20 form this communication link using GPRS tunneling protocol (GTP) to form a tunnel. Gateway 22 uses this GTP tunnel to ensure that packets are communicated to and from serving node 20 currently acting as the attachment point for mobile device 12. Thus, if mobile device 12 moves to an area served by a different serving node 20, gateway 22 can reattach the tunnel to the new serving node 20.

In providing mobile devices 12 access to data networks, gateways 22 maintain routing information for these mobile devices 12. As previously discussed, this routing information enables gateway 22 to tunnel packets to appropriate serving nodes 20 for each attached mobile device 12. Thus, during operation, gateway 22 acts as the termination point for the mobile portion of communications between mobile devices 12 and data networks. That is, devices within data networks communicating with mobile devices 12 need not have any awareness of the mobile nature of mobile devices 12.

Before forming a communication link for mobile device 12, gateway 22 processes the network access request received from serving node 20. This processing includes steps such as authentication, authorization and address assignment. To aid with this processing, gateway 22 may access DHCP server 28 and radius server 30. For example, gateway 22 may use DHCP server 28 to dynamically allocate an IP address to identify mobile device 12 during a communication session. Similarly, gateway 22 may access radius server 30 to validate a request that identifies a requested network and potentially a service provided by the network.

Radius server 30 validates users by authenticating and/or authorizing users. In response to an authentication and authorization request that identifies a user, password and requested network, radius server 30 indicates whether the user is authorized and authenticated. For example, using the user identifier and password, radius server 30 can authenticate the identity of the user. Using the user identifier and requested network, radius server 30 can determine whether the user is authorized to access that network. Similarly, with a user identifier, a requested network, and a specified service, radius server 30 can determine whether the user is authorized to access the particular service provided by the network. Therefore, radius server 30 may work with gateways 22 to ensure appropriate access to services provided by data networks 18.

To gain access to a data network, mobile device 12 generates and communicates a request to operator network 16. This request includes fields identifying the requested network, a user identifier and other suitable information. Mobile device 12 generates the request using stored information and/or information provided by a user. For example, through a graphical user interface, a user may provide a user identifier, such as Bob, and specify a network to access, such as Intranet-.com. In response to such a request, mobile device 12 may generate a network access request that identifies an access point name of Intranet.com and a user identifier of Bob. As previously discussed, mobile device 12 also permits users to access particular services offered by a requested network. Thus, mobile device 12 may further incorporate a requested service into a network access request.

According to particular embodiments, mobile device 12 incorporates the requested service into the value transmitted in the user identifier field of the network access request. For example, given the user Bob requesting access to a "games" service at Intranet.com, mobile device 12 generates a request with the value Bob@games in the user identifier field and the value Intranet.com in the access point name field. Thus, the network access request specifies the user name, the requested network, and the specific service requested.

In this example, mobile device 12 incorporates the actually requested access point name within the user identifier. This field is selected because, with respect to HLR 26 and serving node 20, this is a pass-through field. That is, when using particular protocols, the user identifier field does not affect the operation of HLR 26 or serving node 20. Moreover, serving node 20 passes the value of the user identifier field through in the network access request forwarded on to gateway 22. Therefore, the user identifier value set by mobile device 12 passes to gateway 22 without affecting the operation of serving node 20 or HLR 26, and can thus include any suitable information generated by mobile device 12 for interpretation by gateway 22. However, while in the example given, mobile device 12 includes the requested service in the user identifier value, system 10 contemplates mobile device 12 incorporating this value within any suitable pass-through field of the network access request. That is, network access requests from mobile devices 12 may include a number of different pass-through fields, and system 10 contemplates mobile devices 12 and gateways 22 using any one of these pass-through fields in which to indicate the requested service.

After generating the network access request, mobile device 12 communicates the request to operator network 16. Within operator network 16, serving node 20 receives and processes the network access request. As previously discussed, serving node 20 processes the request using HLR 26 and domain name server 24. Using HLR 26, serving node 20 validates information in the request, such as the identified access point name. After receiving validation from HLR 26, serving node 20 determines the appropriate gateway 22 to receive a forwarded version of the network access request. To identify this destination, serving node 20 communicates a domain name lookup request to domain name server 24, with the lookup request identifying the access point name from the network access request. Domain name server 24 responds with the IP address for one or more gateways 22 linking to the identified network.

After determining an IP address for gateway 22 to receive the network access request, serving node 20 forwards the request to the identified destination. As previously discussed, serving node 20 may reformat the network access request received from mobile device 12 to conform to protocols expected by gateway 22. According to particular embodiments, whether or not reformatting takes place, the information reflected in pass-through fields remains unchanged. Thus, given the example values above, the user identifier value in the network access request forwarded to gateway 22 will include a value of Bob@games. Thus, serving node 20 may unwittingly pass through the service requested by mobile device 12 for processing by gateway 22.

Upon receiving the network access request forwarded by serving node 20, gateway 22 processes and determines whether to grant the request. As previously discussed, gateway 22 may access other elements, such as DHCP server 28 and radius server 30, during this processing. To support service-based access to data networks 18, gateway 22 can interpret information provided by mobile devices 12 to specify requests for particular services. However, according to particular embodiments, gateway 22 supports both traditional and service-based access to data networks 18. Thus upon receiving a network access request, gateway 22 may initially determine whether or not the request specifies a particular service. For example, if the user identifier field is designated as the carrier for service requests, gateway 22 access the user identifier field of the network access request to determine whether or not mobile device 12 specified a service. Upon detecting, for example, a designated delimiter, gateway 22 parses the user identifier field to determine the user identifier value and the requested service. In the given example, gateway 22 uses the @ sign as a delimiter to parse the user identifier value of Bob and the requested service value of games.

According to particular embodiments, data networks 18 may require accessing users to specify a service. Thus based on the access point name identified in the network access request, gateway 22 may determine whether or not service-based access is required. In particular embodiments, if service-based access is required, gateway 22 denies the request if no service was specified. For example, gateway 22 can respond to serving node 20 to deny the request. Alternatively, gateway 22 may process the request using a default or generic service if no service was specified. In this manner, gateway 22 can permit service-based access to data networks 18 for users that are unaware or unable to generate requests specifying a requested service.

With the determined information, gateway 22 validates the request using radius server 30. For example, gateway 22 may communicate a validation message to radius server 30 that identifies a user identifier, password, access point name, and requested service. With this information, radius server 30 performs authentication and authorization as appropriate. According to particular embodiments, radius server 30 uses the user identifier and password to authenticate the user, and then uses the user identifier, access point name, and requested service to authorize the user. After processing the information, radius server 30 informs gateway 22 of whether or not the user is validated. However, while particular steps for authentication and authorization are described, system 10 contemplates radius server 30 using any suitable techniques for validating user access to networks and/or services.

If validated, gateway 22 performs other appropriate processing, such as determining an IP address to dynamically assign to mobile device 12 using DHCP server 28. For validated requests, gateway 22 also forms a communication link with serving node 20, for example, by establishing a GTP tunnel. Serving node 20 and gateway 22 then use this communication link to transport packets across operator network 16 for communications between mobile device 12 and the requested network.

FIG. 2 illustrates a particular embodiment of mobile device 12 that includes a user interface 50, a wireless interface 52, a processor 54 and a memory 56. In general, mobile device 12 provides wireless services, including packet-based services, using wireless interface 52. Mobile device 12 provides access to remote data networks 18 by generating network access requests. Moreover, mobile device 12 supports service-based access by generating requests that specify particular services offered by data networks 18.

User interface 50 provides for interactions with users of mobile device 12. For example, user interface 50 may include a display, keypad and/or other suitable elements for presenting information to and receiving information from users. Wireless interface 52 supports wireless communications between mobile device 12 and other communications equipment, such as wireless access points or base transceiver stations. Processor 54 controls the management and operation of mobile device 12. For example, processor 54 may include one or more microprocessors, programmed logic devices, or other suitable elements for controlling the operation of mobile device 12.

Mobile device 12 also includes memory 56, which in the embodiment illustrated includes code 58, configuration information 60, and a user request 62. Code 58 includes software and/or other appropriate controlling logic for use by elements of mobile device 12, such as processor 54. Configuration information 60 includes start-up, operating, and other suitable settings and configurations for use by mobile device 12. For example, configuration information 60 may include a mobile identifier and indicate whether or not to enable service-based access when communicating with certain operator networks 16 and/or data networks 18. User request 62 includes information, pre-specified and/or provided by a user, for generating a network access request. For example, user request 62 may include a user identifier, password, a requested access point name, and a requested service.

During operation, mobile device 12 generates network access requests and communicates these requests through operator network 16 using wireless interface 52. Mobile device 12 may generate these network access requests in response to commands received from a user through user interface 50. For example, through a web browser, dialog box, or other suitable interface, a user may provide a user identifier, password, and requested access point name and service. However, some or all of this information may be pre-configured within memory 56 by the user, manufacturer, and/or administrator. Processor 54 builds a network access request using information provided by the user and information from memory 56. In building the network access request, mobile device 12 may determine whether service-based access is appropriate or required. For example, mobile device 12 may access configuration information 60 to determine whether service-based access is supported by operator network 16 providing service to mobile device 12.

If service-based access is appropriate, mobile device 12 builds the network access request to indicate the requested service. As previously discussed, mobile device 12 builds a service-based network access request by inserting the requested service within a pass-through field of the request. To accomplish this, processor 54 builds a pass-through string for insertion into the pass-through field. For example, processor 54 may build an @ sign delimited string that indicates both the user identifier and the requested service. Processor 54 then inserts this string into the user identifier field of the network access request. As previously discussed, this enables gateway 22 to parse and interpret the different portions of the user identifier field. However, the use of the user identifier field is given only as an example, and system 10 contemplates mobile device 12 using any suitable pass-through field within a network access request in which to incorporate the requested service.

While the embodiment illustrated and the preceding description focus on a particular embodiment of mobile device 12 that includes specific elements, system 10 contemplates mobile device 12 having any suitable combination and arrangement of elements for providing wireless packet-based services and supporting service-based access to remote networks. Thus, the modules and functionalities described may be combined, separated or otherwise distributed among any suitable functional components. For example, mobile device 12 may include a wireless telephone coupled to a mobile computer such that the mobile computer accesses packet-based services wirelessly using the mobile telephone. System 10 further contemplates mobile device 12 implementing some or all of the functionalities described using logic encoded in media, such as software or programmed logic devices.

FIG. 3 is a block diagram illustrating exemplary functional components for gateway 22 that include an operator network interface 80, an external network interface 82, a processor 84, and a memory 86. In general, gateway 22 provides an interface between operator network 16 and other networks, such as internet 18 and intranet. To provide this interface, gateway 22 handles network access request from mobile devices 12 that identify particular networks using access point names. During operation, gateway 22 supports the processing of network access requests that specify particular services to access within data networks 18.

Operator network interface 80 links gateway 22 to other equipment within operator network 16. For example, using operator network interface 80, gateway 22 may communicate with serving node 20, DHCP server 28, radius server 30, and other appropriate elements within operator network 16. External network interface 82 links gateway 22 with one or more external networks, such as data networks 18, that can potentially include private networks, such as intranets, and public networks, such as the Internet.

Processor 84 controls the operation and management of elements within gateway 22. For example, processor 84 may include one or more microprocessors, programmed logic devices, or other appropriate controlling elements. Memory 86 represents any suitable combination and arrangement of local and/or remote storage devices for use by gateway 22 to maintain and access information during operation. In the embodiment illustrated, memory 86 maintains code 88, configuration information 90, and access point name entries 92. Code 88 represents software and/or other appropriate controlling logic for use by elements of gateway 22, such as processor 84, during the operation of gateway 22. For example, code 88 may include routines for processing network access requests, establishing communication links with serving node 20, and providing network access for mobile devices 12. Configuration information 90 includes start-up, operating, and other suitable settings and configurations for use by gateway 22.

Each access point name entry 92 includes information for use by gateway 22 in handling network access requests that identify that particular access point name. For example, each access point name entry 92 may indicate an access point name value and a DHCP server and radius server for use in processing that particular access point name. Each entry 92 may further indicate information for service-based access. For example, entry 92 may indicate whether or not service-based requests are required and indicate which services are supported. Using this information, gateway 22 can analyze network access requests to determine whether they appropriately specify services.

During operation, gateway 22 interfaces between operator network 16 and data networks, and provides mobile devices 12 access to these data networks in response to network access requests. Gateway 22 further supports the processing of network access requests that specify service-based access requests. Upon receiving a network access request, gateway 22 determines the access point name identified in the request and determines the service, if any, specified. For example, as previously discussed, if the user identifier field is used as the carrier of the requested service, gateway 22 parses the user identifier value to extract the user identifier and the requested service.

Using the access point name from the request, gateway 22 examines access point name entries 92 to determine a matching entry. Upon finding a match, gateway 22 can determine whether the identified network supports service-based access and, if so, what services are supported. If the identified network supports or requires service-based access, gateway 22 compares the requested service to the supported services. If the requested service is not supported, gateway 22 may deny the access request. Similarly, if no service is specified and the identified network requires service-based access, gateway 22 may deny the request. Alternatively, gateway 22 can process the request as if it had specified a generic or default service.

After performing initial validation as appropriate, gateway 22 validates the network access request with radius server 30. According to particular embodiments, gateway 22 and radius server 30 support different types of validation based on whether or not service-based access is requested. For example, for non-service-based access, gateway 22 communicates a validation message to radius server 30 that identifies a user identifier, password, and requested network. For service-based access, gateway 22 communicates a validation message to radius server 30 that further identifies a requested service. Radius server 30 performs authorization and authentication of the validation message as appropriate and then replies to gateway 22.

In addition to validating the request with radius server 30, gateway 22 may also communicate with other elements of operator network 16 during processing of network access requests. For example, gateway 22 may access DHCP to determine an IP address for assigning to mobile device 12. If the network access request is valid, gateway 22 replies to serving node 20 and establishes a link with serving node 20. For example, as previously discussed, gateway 22 and serving node 20 may form a GTP tunnel for transporting packets communicated between mobile device 12 and data network 18.

Thus, gateway 22 communicates with various elements of system 10 to process network access requests and handle access of mobile devices 12 to data networks 18. However, while the embodiment illustrated and the preceding description focus on a particular embodiment of gateway 22 that includes specific elements, system 10 contemplates gateway 22 having any suitable combination and arrangement of elements for interfacing between operator network 16 and data networks 18 and for processing network access requests that potentially specify particular services. Therefore, the modules and functionalities described may be combined, separated, or otherwise distributed among any suitable functional components, and some or all of the functionalities of gateway 22 may be implemented by logic encoded in media, such as software and programmed logic devices. Moreover, system 10 contemplates gateway 22 and other elements of operator network 16 sharing various functions as appropriate.

FIG. 4 is a flowchart illustrating a method for generating a network access request that potentially specifies a particular service to access. The following text describes the operation of the method with respect to mobile device 12. Mobile device 12 determines a user identifier and password at step 100. For example, mobile device 12 may present a log-in dialog using user interface 50 and receive input from a user. Alternatively, mobile device 12 may access memory 56 to determine pre-configured user identifier and password information. Mobile device 12 determines the requested access point name at step 102. Similar to the determination of the user identifier and password, mobile device 12 may use information maintained within memory 56 and/or interaction with a user through user interface 50. Mobile device 12 determines whether service-based access is enabled at step 104. For example, mobile device 12 may access memory 56 to determine whether operator network 16 and the requested access point name support service-based access. If not, mobile device 12 generates a conventional network access request at step 106.

However, if service-based access is enabled, mobile device 12 determines a requested service at step 108. For example, mobile device 12 may access memory 56 or interact with a user through user interface 50. Mobile device 12 then builds a service-based network access request at steps 110 through 114. Mobile device 12 generates the network access request at step 110 and then builds a pass-through string at step 112. According to particular embodiments, this pass-through string includes the requested service and other information typically communicated in the pass-through field. For example, as previously discussed, mobile device 12 may build a string that includes both the user identifier and the requested service. Mobile device 12 sets the pass-through field equal to the pass-through string at step 114.

After generating a conventional or service-based network access request, mobile device 12 communicates the request to serving node 20 at step 116. Mobile device 12 then awaits a response from operator network 16 at steps 118 and 120. At step 118, mobile device 12 determines whether a response has been received, and at step 120, mobile device 12 determines whether the request has timed out. If the request has timed out, mobile device 12 may indicate an error at step 122 and complete processing of the network access request. If a response is received and the response affirms the connection at step 124, mobile device 12 establishes a packet-based communication session at step 126. This enables the exchange of any suitable packet-based data between mobile device 12 and the requested network. If the response denies the request, mobile device 12 may indicate the error at step 122.

The flowchart and preceding description outline the operation of mobile device 12 to support service-based network access requests. However, the flowchart and accompanying description illustrate only an exemplary method of operation, and system 10 contemplates mobile devices 12 using any suitable techniques and elements for handling service-based network access requests. Therefore, many of the steps in this flowchart may take place simultaneously and/or in different orders than as shown. In addition, mobile device 12 may use methods with additional steps, fewer steps, and/or different steps, so long as the methods remain appropriate.

FIG. 5 is a flowchart illustrating a method for gateway 22 to handle received network access requests. Gateway 22 receives a network access request from serving node 20 at step 150. Gateway 22 then determines the requested access point name from the access point name field at step 152 and accesses access point name entries 92 using the determined value at step 154. Based on this access, gateway 22 determines whether the network identified by the access point name supports service-based access at step 156. If not, gateway 22 determines the user identifier and password from the request at step 158 and requests validation of the user at step 160. For example, gateway 22 may communicate a validation message to radius server 30, with the validation message indicating the user identifier, password, and access point name.

If the indicated network supports service-based access, gateway 22 determines the requested service at step 162. If, for example, the service is incorporated in the user identifier field, gateway 22 parses the field to determine the requested service and the user identifier. This enables gateway 22 to determine whether the request indicates a service at step 164. If no service is indicated, gateway 22 determines whether the identified network requires service-based access at step 166. If not, gateway 22 validates the request using the user identifier, password, and access point name. As such, gateway determines the user identifier and password from the request at step 158 and requests validation of the user at step 160. If the request fails to identify a service and the requested network requires service-based access, gateway 22 denies the request at step 170. As previously discussed, gateway 22 may alternatively use a default service value and request validation for the user based on the default service.

If the request indicates a service, gateway 22 determines whether the indicated access point name supports the service at step 172. For example, gateway 22 may access entries 92 to determine whether the matching entry 92 indicates support for the identified service. If not, gateway 22 denies the request at step 170. However, if supported, gateway 22 determines the user identifier and password from the request at step 172 and requests validation of the user and service at step 174. To request validation, for example, gateway 22 may communicate a validation message to radius server 30, with the validation message indicating the user identifier, password, access point name and service.

Gateway 22 determines whether the user is validated at step 176. For example, in response to a validation message, radius server 30 indicates whether or not the user is authenticated and authorized. This response may be based on the information supplied by gateway 22, such as the user identifier, password, access point name, and requested service. If the request is not validated, gateway 22 communicates a response to serving node 20 that denies the network access request at step 178. However, if the request is validated, gateway 22 communicates a response to serving node 20 that affirms the request at step 180. Gateway 22 then establishes a communication link with serving node 20 at step 182. For example, as previously discussed, gateway 22 may establish a GTP tunnel with serving node 20 to provide a link for transporting packets between mobile device 12 and the requested network. Moreover, gateway 22 may communicate with the requested network to indicate the authorization of the user to access the requested service.

Thus, the flowchart and preceding description outline the operation of gateway 22 in handling network access requests that potentially include service-based access requests. However, the flowchart and accompanying description illustrate only an exemplary method of operation, and system 10 contemplates gateway 22 using any suitable techniques and elements for processing network access requests. Therefore, many of the steps in this flowchart may take place simultaneously and/or in different orders than as shown. In addition, gateway 22 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for processing network access requests for mobile devices, the method comprising:
   receiving, at a gateway, a network access request for establishment of a communication link for data communications for a mobile device, the network access request comprising a pass-through field and a requested network field that indicates a data network;
   determining a requested service from text in the pass-through field; determining a user identifier; determining a password;
   requesting validation of the network access request based on the user identifier, the password, the data network, and the requested service;
   receiving validation of the network access request; and
   establishing the communication link for the transport of packets communicated between the mobile device and the data network.

2. The method of claim 1, wherein determining the requested service comprises parsing the text at a delimiter to determine a value for the pass-through field and the requested service.

3. The method of claim 1, wherein the pass-through field comprises a user identifier field, and determining the requested service and determining the user identifier comprise parsing the text at a delimiter to determine the requested service and the user identifier.

4. The method of claim 1, wherein the pass-through field does not affect operation of a home location register in verifying the data network indicated in the requested network field.

5. The method of claim 1, wherein:
   the request is a create packet data protocol (PDP) context request generated by a serving generalized packet radio service (GPRS) support node (SGSN);
   the data network is an access point name (APN) set by the mobile device;
   the requested network field is an APN information element of the network access request; and
   the pass-through field is at least a portion of a protocol configuration option (PCO) information element of the create PDP context request used to include a user identifier.

6. The method of claim 5, wherein the communication link comprises a GPRS tunneling protocol (GTP) tunnel for transporting data between a serving GPRS support node and a gateway GPRS serving node (GGSN).

7. The method of claim 1, further comprising:
   maintaining a plurality of access point name (APN) entries each comprising an APN value and a plurality of supported services;
   determining one of the APN entries matching to the data network indicated in the requested network field;
   determining whether one of the supported services for the matching APN entry matches to the requested service; and
   in response to determining that one of the supported services matches the requested service, performing the steps of requesting validation, receiving validation, and forming the communication link.

8. A gateway linking an operator network to one or more packet-based networks, the gateway comprising:
  a first interface operable to couple to a data network;
  a second interface operable to receive a network access request for establishment of a communication link for data communications for a mobile device, the network access request comprising a pass-through field and a requested network field that indicates the data network;
  a processor operable to determine a requested service from text in the pass-through field, to determine a user identifier, to determine a password, to request validation of the network access request based on the user identifier, the password, the data network, and the requested service, to receive validation of the network access request, and to establish the communication link for the transport of packets communicated between the mobile device and the data network.

9. The gateway of claim 8, wherein the processor is further operable to determine the requested service by parsing the text at a delimiter to determine a value for the pass-through field and the requested service.

10. The gateway of claim 8, wherein the pass-through field comprises a user identifier field, and wherein the processor is further operable to determine the requested service and to determine the user identifier by parsing the text at a delimiter to determine the requested service and the user identifier.

11. The gateway of claim 8, wherein the pass-through field does not affect operation of a home location register in verifying the data network indicated in the requested network field.

12. The gateway of claim 8, wherein:
  the request is a create packet data protocol (PDP) context request generated by a serving generalized packet radio service (GPRS) support node (SGSN);
  the data network is identified by an access point name (APN) set by the mobile device;
  the requested network field is an APN information element of the network access request; and
  the pass-through field is at least a portion of a protocol configuration option (PCO) information element of the create PDP context request used to include a user identifier.

13. The gateway of claim 12, wherein the communication link comprises a GPRS tunneling protocol (GTP) tunnel for transporting data between the gateway and a serving GPRS support node.

14. The gateway of claim 8, further comprising:
  a memory maintaining a plurality of access point name (APN) entries each comprising an APN value and a plurality of supported services; and
  wherein the processor is further operable to determine one of the APN entries matching to the data network indicated in the requested network field, to determine whether one of the supported services for the matching APN entry matches to the requested service, and, in response to determining that one of the supported services matches the requested service, to perform the operations of requesting validation, receiving validation, and forming the communication link.

15. A non-transitory computer readable medium encoded with computer executable instructions for processing network access requests for mobile devices, the logic embodied on a medium and operable when executed to perform the steps of:
  receiving a network access request for establishment of a communication link for data communications for a mobile device, the network access request comprising a pass-through field and a requested network field that indicates a data network;
  determining a requested service from text in the pass-through field; determining a user identifier; determining a password;
  requesting validation of the network access request based on the user identifier, the password, the data network, and the requested service;
  receiving validation of the network access request; and
  establishing the communication link for the transport of packets communicated between the mobile device and the data network.

16. The non-transitory computer readable medium of claim 15, further operable to determine the requested service by parsing the text at a delimiter to determine a value for the pass-through field and the requested service.

17. The non-transitory computer readable medium of claim 15, wherein the pass-through field comprises a user identifier field, the logic further operable to determine the requested service and to determine the user identifier by parsing the text at a delimiter to determine the requested service and the user identifier.

18. The non-transitory computer readable medium of claim 15, wherein the pass-through field does not affect operation of a home location register in verifying the data network indicated in the requested network field.

19. The non-transitory computer readable medium of claim 15, wherein:
  the request is a create packet data protocol (PDP) context request generated by a serving generalized packet radio service (GPRS) support node (SGSN);
  the data network is an access point name (APN) set by the mobile device;
  the requested network field is an APN information element of the network access request; and
  the pass-through field is at least a portion of a protocol configuration option (PCO) information element of the create PDP context request used to include a user identifier.

20. The non-transitory computer readable medium of claim 19, wherein the communication link comprises a GPRS tunneling protocol (GTP) tunnel for transporting data between a serving GPRS support node and a gateway GPRS serving node (GGSN).

21. The non-transitory computer readable medium of claim 15, further operable to perform the steps of:
  maintaining a plurality of access point name (APN) entries each comprising an APN value and a plurality of supported services;
  determining one of the APN entries matching to the data network indicated in the requested network field;
  determining whether one of the supported services for the matching APN entry matches to the requested service; and
  in response to determining that one of the supported services matches the requested service, performing the steps of requesting validation, receiving validation, and forming the communication link.

22. A gateway linking an operator network to one or more packet-based networks, the gateway comprising:
  means for receiving a network access request for establishment of a communication link for data communications for a mobile device, the network access request comprising a pass-through field and a requested network field that indicates a data network;

means for determining a requested service from text in the pass-through field;
means for determining a user identifier;
means for determining a password;
means for requesting validation of the network access request based on the user identifier, the password, the data network, and the requested service;
means for receiving validation of the network access request; and
means for establishing the communication link for the transport of packets communicated between the mobile device and the data network.

* * * * *